United States Patent [19]
May

[11] Patent Number: 5,653,561
[45] Date of Patent: Aug. 5, 1997

[54] SWARF BOOT

[76] Inventor: Robert May, 6907 N. Kilpatrick, Chicago, Ill. 60646

[21] Appl. No.: 441,215

[22] Filed: May 15, 1995

Related U.S. Application Data

[63] Continuation-in-part of Ser. No. 228,444, Apr. 15, 1994, abandoned, which is a continuation-in-part of Ser. No. 96,664, Jul. 23, 1993, abandoned.

[51] Int. Cl.$^6$ ...................................................... B23B 47/34
[52] U.S. Cl. ............................................ 408/67; 408/72 R
[58] Field of Search ................................ 408/67, 72 R, 408/56

[56] References Cited

U.S. PATENT DOCUMENTS

| | | | |
|---|---|---|---|
| 3,351,143 | 11/1967 | Seibold et al. | 175/209 |
| 3,583,821 | 6/1971 | Shaub et al. | 408/72 |
| 4,214,317 | 7/1980 | Kelly, Sr. | 2/2 |
| 4,251,171 | 2/1981 | Brett | 408/67 |
| 4,848,980 | 7/1989 | Broussard | 408/67 |
| 4,921,375 | 5/1990 | Famulari | 408/67 |
| 4,955,984 | 9/1990 | Cuevas | 408/67 |
| 5,292,210 | 3/1994 | Nowick | 408/67 |

FOREIGN PATENT DOCUMENTS

| | | | |
|---|---|---|---|
| 2055010 | 5/1972 | Germany . | |
| 2356565 | 5/1975 | Germany . | |
| 2404504 | 8/1975 | Germany | 408/67 |
| 2434641 | 1/1976 | Germany . | |
| 2912396 | 10/1980 | Germany . | |
| 3140776 | 4/1983 | Germany . | |
| 222222 | 5/1985 | Germany | 408/67 |
| 200905 | 8/1988 | Japan | 408/56 |
| 8303801 | 11/1983 | Netherlands . | |
| 814655 | 3/1981 | U.S.S.R. . | |

Primary Examiner—Daniel W. Howell
Attorney, Agent, or Firm—Juettner Pyle Lloyd & Piontek

[57] ABSTRACT

A swarf boot comprises a flexible and elastic, generally frusta-conical, unitary member for capturing swarf, cuttings, dust and debris from drilling operations. The boot has two open ends, namely a proximal end adapted to receive and hold a drill body, and a distal end adapted to engage a surface to be drilled. In between the two ends, the swarf booth comprises a generally frusta-conical, corrugated body. The drill chuck is received within the interior of the boot. The inside dimension of the boot is substantially larger than the outside diameter of the chuck. Thereby, the boot surrounds but does not come in contact with the drill chuck, allowing the chuck rotate freely while the boot of the invention remains stationary. Optionally, the boot may include a outlet conduit for attachment to a vacuum to remove swarf during drilling operations. The boot may also include a handle on the distal end of the boot.

16 Claims, 4 Drawing Sheets

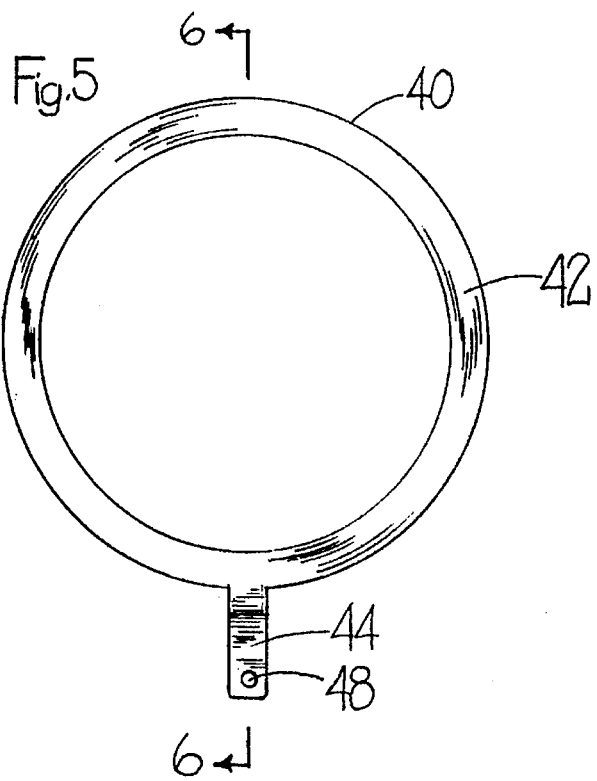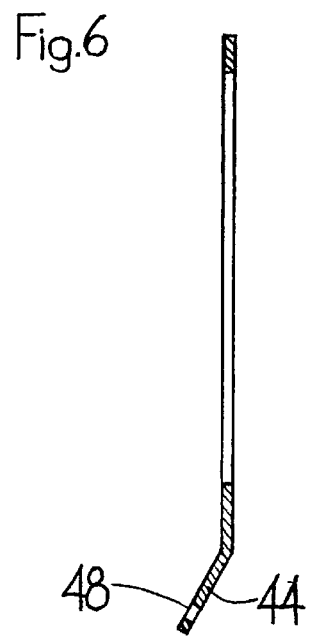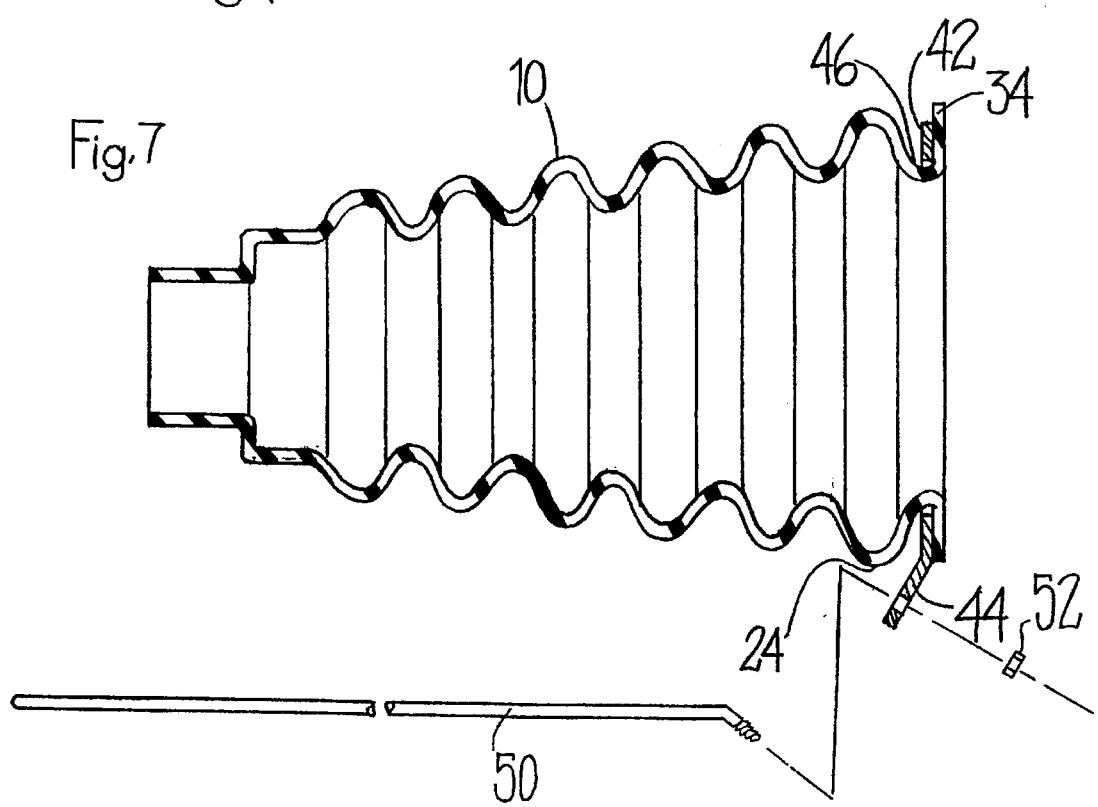

SWARF BOOT

CROSS REFERENCE

This application is a continuation-in-part of application Ser. No. 08/228,444, filed Apr. 15, 1994, now abandoned, which is a continuation-in-part of application Ser. No. 08/096,664 filed Jul. 23, 1993, now abandoned.

BACKGROUND OF THE INVENTION

The present invention relates to devices for capturing the swarf or chips produced by drilling operations and more particularly to a removable boot for catching swarf from a hand held electric drill.

Electricians, carpenters and other tradesmen routinely use hand held electric drills to bore holes into building materials. The drilling operation produces swarf, cuttings, dust and debris, which can be a problem. Swarf can be harmful to the tradesman. Swarf can fall into the tradesman's eyes, nose, mouth, ears, hair or clothing when drilling, especially when drilling into ceilings. The creation of loose or flying swat may be unacceptable in some locations, e.g., occupied businesses and homes. And, clean up of drilling swarf is always a time consuming and unpleasant chore.

Various devices for capturing drilling swarf have been devised to meet these problems. One such device is the chip catcher shown and described in U.S. Pat. No. 3,583,821 to Melvin H. Shank. The Shaub chip catcher is adapted to fit onto a hand held electric drill. It comprises a frusta-conical member, a bearing member connected to the small end of the frusta-conical member, and a rubber seal connected to the large end of the frusta-conical member. The frusta-conical member is comprised of an inner spring and an outer plastic cover. The spring supports the plastic cover and functions to press the rubber seal against the surface to be drilled. The bearing member has an inner and outer race portions. The inner portion is sized to fit snugly over and onto the drill chuck. The Shaub chip catcher is used by inserting and tightening a drill bit into the chuck, installing the chip catcher onto the chuck, and commencing drilling operations. When the drill is activated the drill chuck rotates, thereby rotating the inner portion of the bearing. The outer portion of the bearing and the rest of the chip catcher remains stationary. To change bits, the catcher must be removed from the drill to exposed the chuck so that the first bit can be removed and another inserted.

There are a few limitations to prior art chip catchers. Moving parts, like Shaub's bearing member, require maintenance, and can break down. Some prior art chip catchers can be used only on one type of drill. Shaub's chip catcher, for example, has a bearing member with a fixed inner diameter, and accordingly, it will fit only one size drill chuck. Since electric drills come with different size chucks, different sized catchers must be made for each drill chuck diameter. Furthermore, some prior art chip catchers must be removed from the drill to make a bit change. This can be cumbersome and time consuming.

For the foregoing reasons, there is a need in the art for a swarf boot that solves these long standing problems.

OBJECTS OF THE INVENTION

It is an object of the invention to provide a swarf boot with no moving parts.

It is another object of the invention to provide a versatile swarf boot that will fit drills of different sizes and configurations;

It is yet another object of the invention to provide a swarf boot that can accommodate bit changes without a need to remove the boot from the drill.

It is an object of the invention to provide a swarf boot that can be quickly and easily extended into operating position when needed to capture swarf, and which can be quickly and easily retracted out of the way when no longer needed;

It is a further object of the invention to provide a swarf boot that has a minimum number of parts and which can be economically manufactured and sold.

SUMMARY OF THE INVENTION

The foregoing objects are met and satisfied by a swarf boot of the invention. The boot is a flexible and elastic, generally frusta conical unitary member. It has two open ends. The proximal end is adapted to receive and hold a drill body. The distal end is adapted to engage a surface to be drilled. In between the two ends, the swarf booth comprises a generally frusta-conical, corrugated body.

Electric drills that are used in the trade have metal or plastic bodies and a chuck for receiving and holding the drill bit. Most drill bodies have a generally cylindrical front portion adjacent to the chuck. The chuck turns with the bit when the drill is operated.

The proximal end of the swarf boot of the invention attaches to the generally cylindrical portion of the drill body adjacent and proximal to the chuck. The chuck is thereby received within the interior of the boot. The inside dimension of the portion of the boot that is adjacent the chuck is substantially larger than the outside diameter of the chuck. Thereby, the boot surrounds but does not come in contact with the drill chuck, allowing the chuck rotate freely while the boot of the invention remains stationary.

The boot material is preferably a stretchable, elastic material such as natural rubber or neoprene. This permits the proximal end of the boot to be stretched to fit may different size and configuration drill bodies. Further versatility is provided by forming the proximal end of the boot with plural adjacent and concentric cylindrical portions of different diameters. A workman may compare his drill body to the boot to determine which of the cylindrical portions best fits his drill body. If a larger diameter cylindrical portion is chosen, the smaller one may be removed with a utility knife or the like. Accordingly, the swarf boot of the invention may fit virtually any drill body.

The body of the boot member is corrugated and flexible. The corrugations provide adequate stiffness to make the boot self supporting, without need for a metal reinforcing spring or the like. If in a particular application, the boot body insufficiently stiff, additional stiffness may be provided by applying removable foam rings within one or more exterior recess of the corrugations of the boot body. The corrugations also provide a spring like resiliency to press the distal end of the boot against the surface to be drilled. The corrugations of the boot, nevertheless, allow sufficient flexibility for the boot to conform to the drilling surface when the drill is held at an inclined angle.

Because the boot is frusta-conical, flexible, elastic and corrugated, it can be compressed like and accordion and stretched rearwardly back over the drill body. Thereby, the boot may be retracted and held in a position where it will not hinder normal use of the drill. When the boot is again needed, it may be readily snapped back to its normal position. In addition, retracting the boot exposes the drill chuck so that drill bits may be readily changed without removing the boot from the drill.

The body may be optionally provided with a tubular outlet for attachment of a vacuum. The vacuum may used to extract swarf, dust and debris from the boot during drilling operations.

The distal end of the boot member desirable has a flange extending radially outward from the distal end of the corrugated body. The function of the flange is to help maintain frictional engagement of the boot with the surface to be drilled, thereby minimizing leakage of the drilling swarf out of the boot.

A handle means may be optionally provided at the distal end of the boot. The handle is used to retract the boot from the surface to be drilled. Thereby the user may view the surface and drill bit to properly align the bit on the surface. The handle preferably comprises a rigid ring having a tab which is adapted to be grasped by the user. The ring fits over the boot within the distal most groove of the corrugated body, adjacent the distal flange. Optionally, a pole may be provided for facilitating retraction and extension of the ring. One end of the pole is removably attached to the ring tab. The pole may be used to hold the ring in a desired position with the same hand that holds the drill.

In operation the proximal end of the boot is stretched and pulled over the distal end of an electric drill so that one of the cylindrical portions engages the drill body adjacent and proximal to the chuck. The boot surrounds and is spaced apart from the chuck so that it is free to rotate. With the handle the workman may pull back one side of the boot to position the drill bit on the surface to be drilled. The workman may then release the handle causing the corrugated boot body to spring outwardly pressing the flange against the work surface. During drilling operations, swarf removed by the drill bit will fall into and be collected by the boot of the invention. After drilling operations have been completed, the swarf may be dumped out of the boot into a suitable waste receptacle. If the swarf boot is no longer needed, the workman may pull if off the drill, or may compress it and pull it rearwardly over the front of the drill body where it may remain until needed again.

Further objects, features and advantages of the swarf boot of the invention will become apparent from the following detailed description when read in conjunction with the accompanying drawings.

BRIEF DESCRIPTION OF THE DRAWINGS

FIG. 5 is a plan view of an optional handle that may be attached to the swarf boot of the invention.

FIG. 6 is a cross-section of the handle taken along line 6—6 of FIG. 5.

FIG. 7 is a longitudinal cross-section of the swarf boot of the invention showing an optional handle and pole attached to the distal end of the swarf boot.

DETAILED DESCRIPTION

Figure 1:
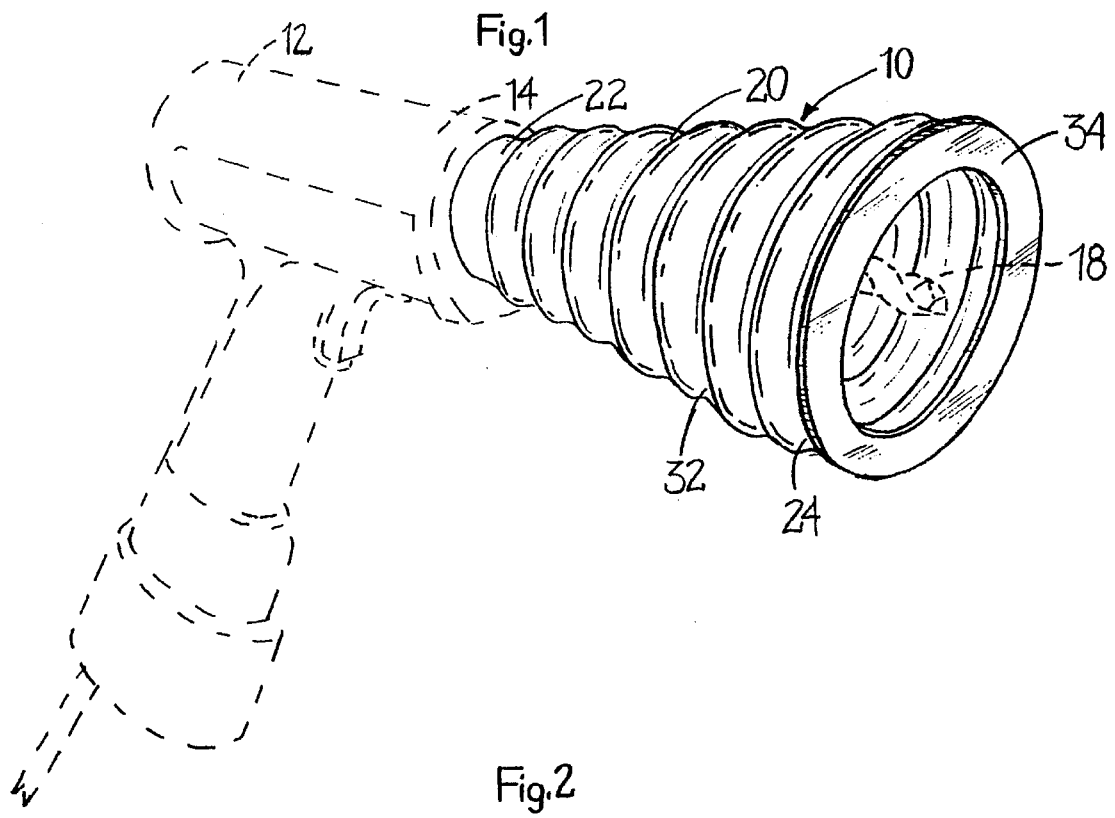
FIG. 1 is a perspective view of the swarf boot of the invention attached to an electric drill.
Figure 2:
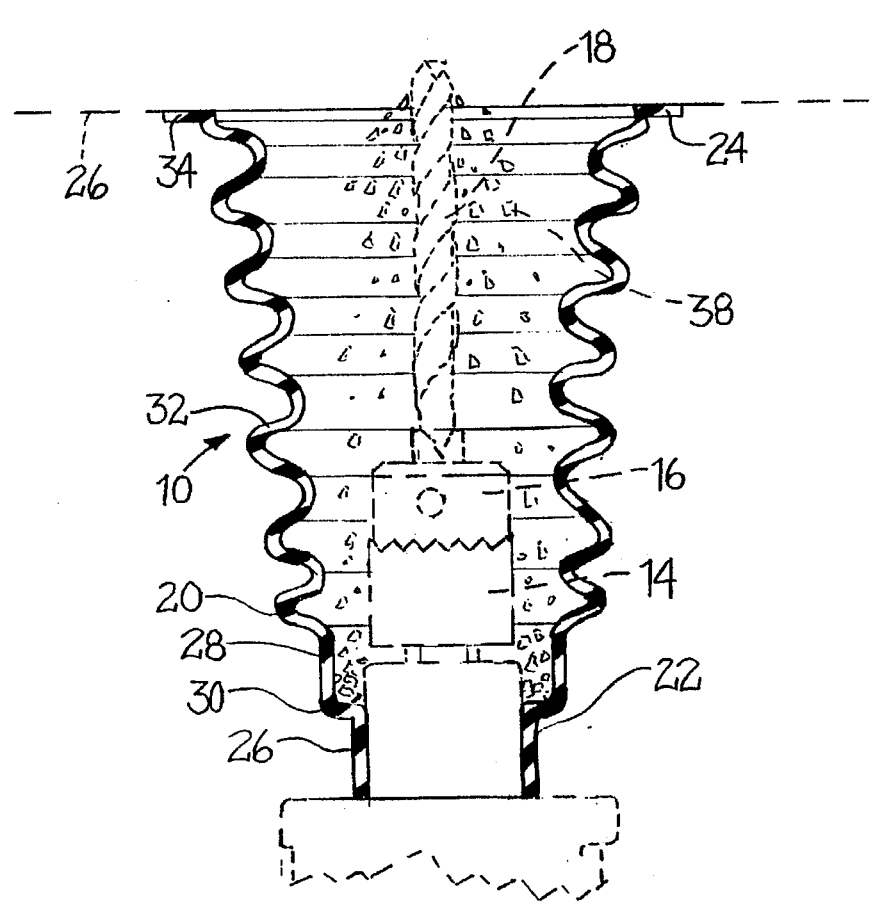
FIG. 2 is a longitudinal cross-section of the swarf boot of the invention, shown in use catching swarf.

Turning now to the drawings, the swarf boot of the invention is shown generally at 10. The boot is shown attached to an electric drill 12. Drill 12 comprises a body 14, chuck 16 and bit 18. The drill 12 does not form a part of the invention. The drill may be of virtually any model of a hand held electric drill.

The boot 10 of the invention comprises a flexible and elastic, generally frusta-conical, unitary member 20. The member 20 has a proximal end 22 for receiving and holding the drill body 14 and a distal end 24 for engaging a suffice 26 to be drilled. The proximal end 22 preferably comprises plural adjacent and concentric cylindrical portions 26 and 28 with a shoulder 30 therebetween. The two cylindrical portions have substantially different diameters, the smaller diameter cylindrical portion being located proximally. Additional cylindrical portions may be provided if desired, but it is felt that the two shown are adequate to fit most commercially available electric drills.

A body portion 32 extends distally outward from cylindrical member 28. The body portion is generally frustaconically shaped and is preferably corrugated. The corrugations provide sufficient rigidity to the boot to make it self supporting. Additional wire reinforcement is not required.

A flange portion 34 extends radially outwardly from the distal end of the body portion 32. The flange functions to provide frictional sealing engagement with the surface 26 to prevent swarf from filling out of the boot during drilling operations.

The boot member 20 is preferably made as a unitary, integrally molded piece. It is fabricated from a flexible and elastic material such as natural or synthetic rubber. Neoprene has been found to work well as it has good flexibility, elasticity, resiliency and durability. However, neoprene boots occasionally will split at mold lines. To avoid this problem, natural rubber may be used. The boot member may be made by any of several well known molding techniques. Dip molding has been used, but injection molding is preferred for quantity production.

Figure 4:
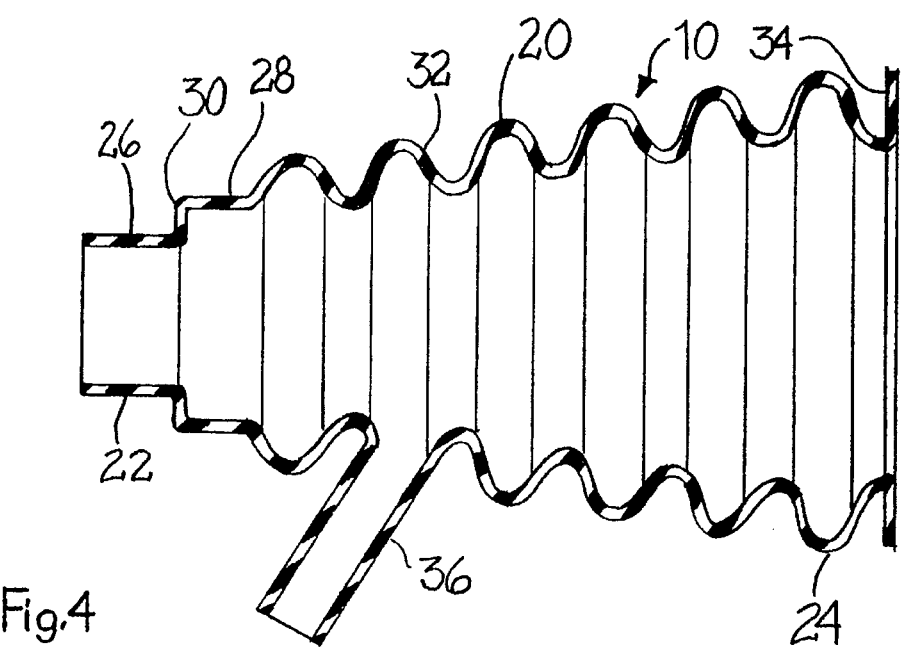
FIG. 4 is a longitudinal cross-section of the swarf boot of the invention showing an optional tubular outlet for attachment to a vacuum.

In a second embodiment, shown in FIG. 4, the boot member 20 has been provided with an outlet conduit 36. Conduit 36 may be connected to a vacuum for removing swarf, dust and debris from the boot during drilling operations. Outlet conduit 36 is a generally tubular member which is preferably formed integrally with boot member 20.

A handle 40 attachable to the distal end 24 of boot 10 is shown in FIGS. 5–7. The handle 40 preferably comprises a ring 42 and tab 44. The interior diameter of ring 42 is sized to be slightly larger that the diameter of the distal most recess 46 of boot 10, adjacent flange 34. Thereby, the ring may fit into the recess and is thereby attached to the distal end of the boot. Since the inner diameter of the ring is slightly larger than the recess, the ring may rotate relative to the boot. As is apparent, the ring may be attached or detached from the boot as desired.

The handle 40 further includes a tab 44 which is adapted to be grasped by a workman. The tab preferably is set at an angle from the ring, projecting in a proximal direction, away from the work surface, to facilitate grasping. The tab may also be provided with an aperture 48 for hanging the handle 46 when it is not is use.

To further facilitate grasping and manipulation of the ring, a pole 50 may be removably attached to the ring 42. Removable attachment of the pole to the ring may be accomplished in any conventional manner. For example, attachment may be made by providing a threaded end on the pole 50, which may be pushed through aperture 48 to be secured by nut 52, as shown in FIG. 7. With the pole, a user may manipulate the ring at a distance from the surface to be drilled, and can use the pole to hold the ring in a desired position with the same hand used to hold the drill.

The handle 40 may be fabricated by stamping it from metal or plastic sheet. Aluminum sheet has been found to be acceptable. The pole is preferably fabricated from metal, but may be molded from plastic.

Although a preferred from of handle has been shown and described, those skilled in the art may readily recognize and make other handle embodiments. For example, a handle could be made by forming an outwardly extending tab portion from the flange 34.

Figure 8:
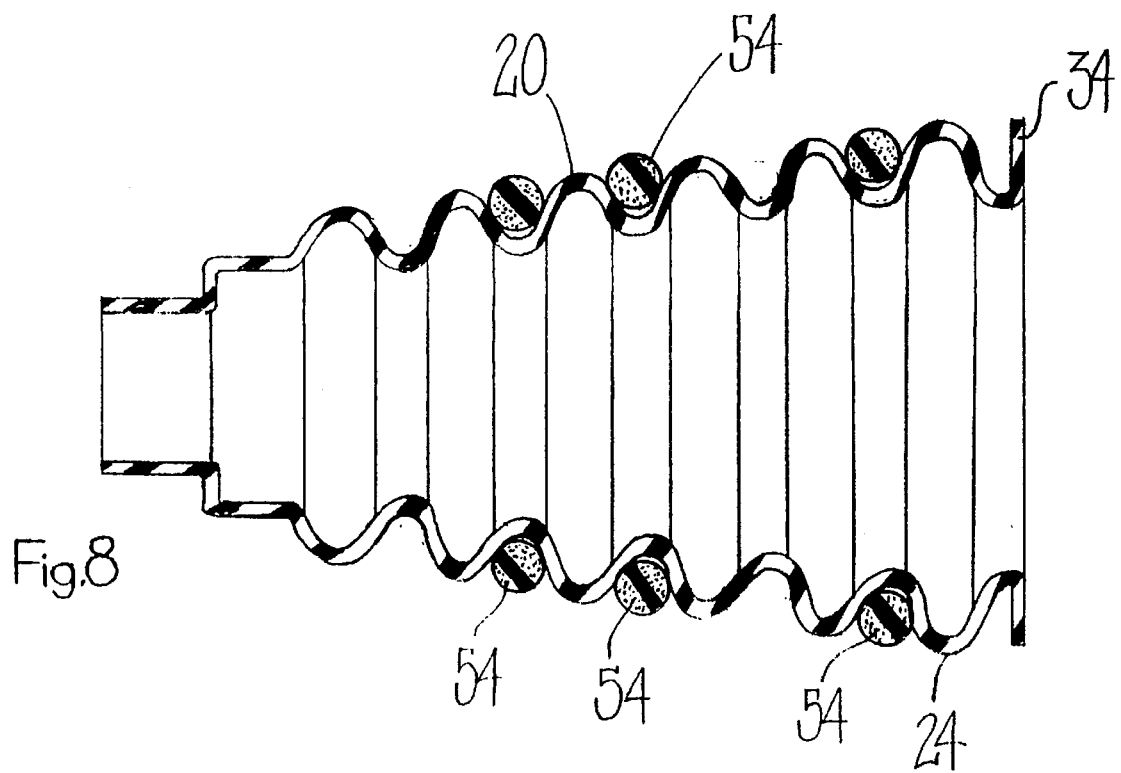
FIG. 8 is a longitudinal cross-section of the swarf boot of the invention showing optional foam rings held in exterior recesses of the corrugations of the boot body.
Figure 9:
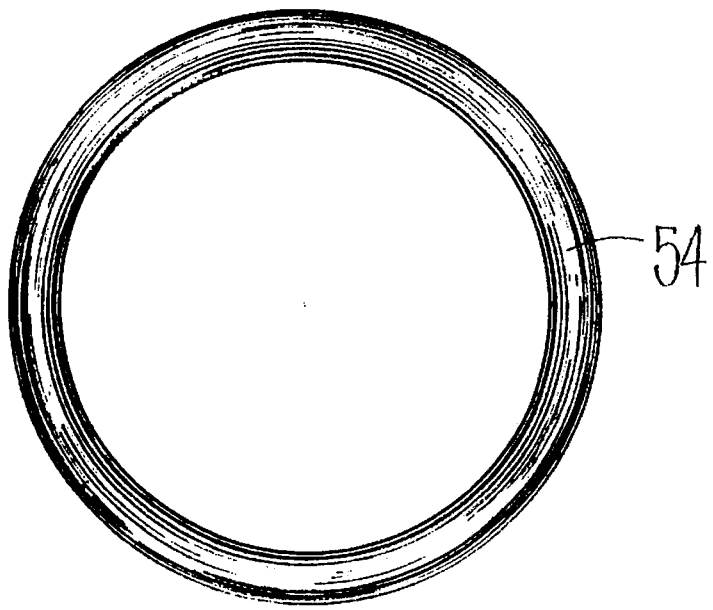
FIG. 9 is a plan view of a foam ring.

FIGS. 8 and 9 illustrate optional, removable foam rings 54 applied to the exterior of the boot member. The foam rings 54 are held within exterior recesses 56 of the boot corrugations, without glue or other attachment. Any number of rings may be used to provide a desired amount of increased stiffness to the boot body. As an example, FIG. 8 illustrates three foam rings. Because the boot body is frusta-conical in shape the diameters of the several recess 56 varies from end to end. Accordingly, several rings of varying interior diameter are need to match the diameter of the recesses.

Foam rings 54 are preferably fabricated from light weight, closed cell foam material. For example, the rings may be constructed from commercially available, one-half inch diameter, construction insulation strips.

The swarf boot of the invention is used as follows. First the proximal end 22 of the boot is compared to the drill body 14 to determine which of the first or second cylindrical portions 26 or 28 best fit the drill body 14. If the second cylindrical section 28 is chosen, the first cylindrical portion 26 is removed with a utility knife or the like. The proximal end 22 is then stretched over the drill chuck 16 and onto the drill body 14. The elasticity of the rubber is adequate to hold the boot to the drill. Nevertheless, a hose clamp (not shown) may be placed around the proximal end 22 to assist in holding the boot to the drill body if desired. The chuck 16 should be free to rotate without contact with the inside of boot member 20.

Figure 3:
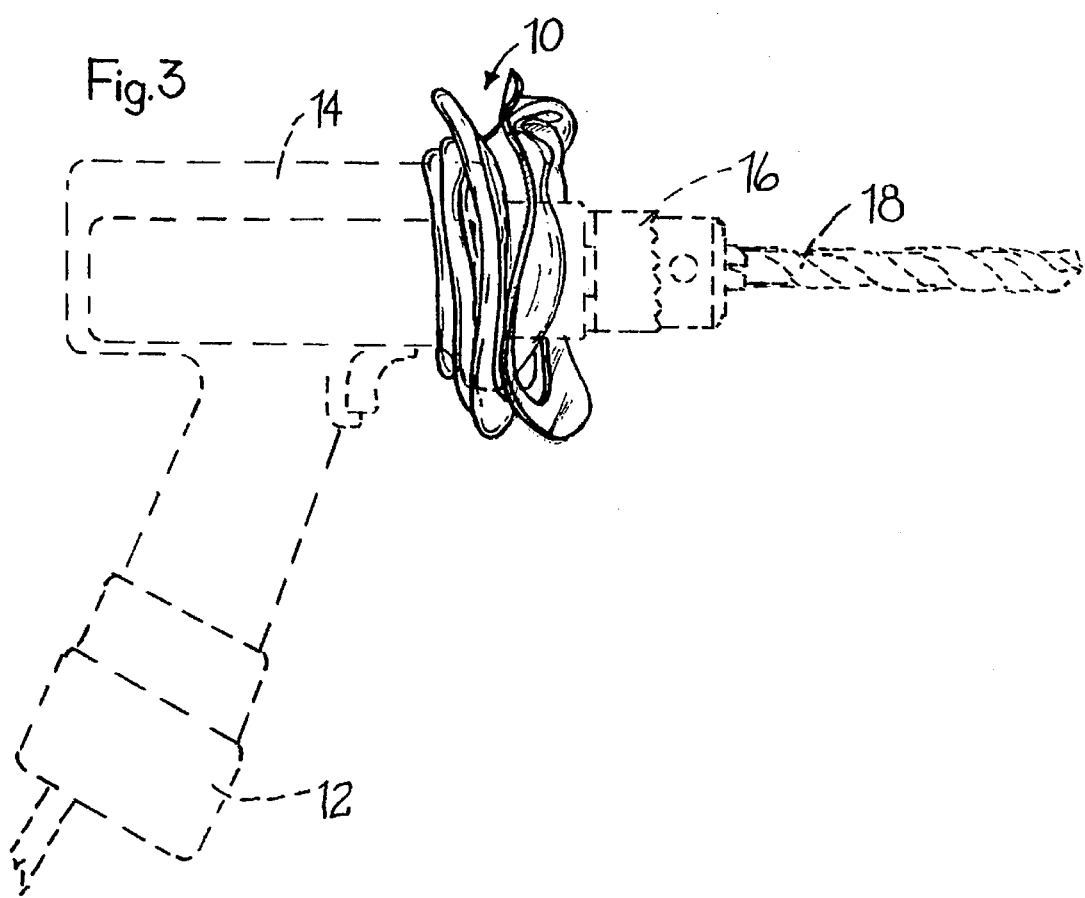
FIG. 3 is a side view of the swarf boot of the invention collapsed and pulled back over the front of an electric drill.

The boot may then be compressed like an accordion and pulled back to expose the drill chuck 16, as illustrated in FIG. 3. A bit 18 is inserted into the chuck and tightened, without interference from the boot member 20. The boot may then be restored to its normal position, as shown in FIG. 1.

To align the drill bit 18 on the surface 26, the workman may pull back a side of the distal end 24 of the boot with handle 40 to view the bit and drilling surface. Once the bit is aligned, the boot may be released, the resilient nature of the corrugated body portion 32 causes the flange portion 34 to be pressed against the surface 26, thereby providing a swarf tight seal between the boot member and the surface, as shown in FIG. 3. Swarf 38 produced by drilling operations is then safely captured within the boot member 32. When drilling operations are complete, the swarf may be dumped into a suitable waste receptacle.

Alternatively, swarf 38 may be evacuated from the interior of the boot by means of a vacuum attached to outlet conduit 36.

The objects and advantages of the invention have thus been shown to be attained in a convenient, economical and facile manner. While the preferred embodiment of the invention has been shown and described, it is to be understood that various modifications and changes may be made thereto without departing from the scope of the invention as defined by the appended claims.

What is claimed is:

1. A boot for catching swarf from a drill, the drill having a body, a chuck and a bit, comprising:

a flexible and elastic member adapted to enclose the drill chuck and bit, said member having two open ends, one of said ends detachably attachable to the drill body in a swarf tight manner, the other said end adapted to frictionally engage a surface to be drilled, said member having an inner dimension greater than the drill chuck, whereby said member surrounds and is spaced apart from the drill chuck and bit so that the chuck and bit may freely rotate within said member without contact with said member; and said one end having a first cylindrical portion of said member, and a second cylindrical portion of said member distally juxtaposed to said first cylindrical portion, said second cylindrical portion having a diameter greater than said first cylindrical portion and being concentric with said first cylindrical portion, said member comprising a generally frusta-conical, corrugated boot body between said ends, the smallest interior diameter of said boot body being greater than that of the drill chuck.

2. A boot as in claim 1, wherein said boot body is compressible, whereby said boot body may be compressed and pulled rearwardly onto the drill body exposing the drill chuck and bit without detaching said member from the drill.

3. A boot as in claim 1, wherein said boot consists of a unitary member.

4. A boot as in claim 1, further comprising a shoulder between said first and said second cylindrical portions.

5. A boot as in claim 1, further comprising a flange extending radially outward from said distal end of said member, said flange for frictional engagement with the surface to be drilled.

6. A boot as in claim 1, further comprising an outlet conduit from said member, said outlet conduit adapted to receive a vacuum for removing swarf from said member.

7. A boot as in claim 1, further comprising a handle on said other end of said member.

8. A boot as in claim 7, wherein said handle comprises a ring engaged with said other end of said member and a tab extending outwardly and proximally from said ring.

9. A boot as in claim 8, further comprising a pole removably attached to said ring.

10. A boot as in claim 1, wherein said corrugated boot body has plural exterior recesses, and further comprising at least one foam ring, each said foam ring held, respectively, in said recesses.

11. A boot for catching swarf from a drill, the drill having a body, a chuck and a bit, comprising:

a unitary, flexible and elastic, generally frusta-conical member, said member adapted to receive and enclose the drill chuck and bit, said member having proximal and distal open ends, said proximal end adapted for detachable attachment to the drill body in a swarf tight manner and said distal end adapted for frictional engagement with a surface to be drilled, said member further comprising a first cylindrical portion at said proximal end of said member;

a second cylindrical portion distally juxtaposed to said first cylindrical portion, said second cylindrical portion having a diameter greater than said first cylindrical portion and being concentric with said first cylindrical portion;

a flange extending radially outward from said distal end of said member, said flange for frictional engagement with the surface to be drilled; and a generally frusta-conical, corrugated boot body between said second cylindrical portion and said flange, the smallest interior diameter of said boot body being greater than that of the drill chuck, whereby said boot body is adapted to surround and be spaced apart from the drill chuck and bit, whereby the chuck and bit may freely rotate within said boot body.

12. A boot as in claim 11, wherein said boot body is compressible, whereby said boot body may be compressed and pulled rearwardly onto the drill body exposing the drill chuck and bit without detaching said proximal end of said member from the drill.

13. A boot as in claim 11, further comprising an outlet conduit from said boot body, said outlet conduit adapted to receive a vacuum for removing swarf from said member.

14. A boot for catching swarf from a drill, the drill having a body, a chuck and a bit, comprising:

a flexible and elastic member adapted to enclose the drill chuck and bit, said member having two open ends, one of said ends detachably attachable to the drill body in a swarf tight manner, the other said end adapted to frictionally engage a surface to be drilled, said member having an inner dimension greater than the drill chuck, whereby said member surrounds and is spaced apart from the drill chuck and bit so that the chuck and bit may freely rotate within said member without contact with said member; and said one end having a first cylindrical portion of said member, and a second cylindrical portion of said member distally juxtaposed to said first cylindrical portion, said second cylindrical portion having a diameter greater than said first cylindrical portion and being concentric with said first cylindrical portion, and a flange extending radially outward from said distal end of said member, said flange adapted for frictional engagement with the surface to be drilled.

15. A boot for catching swarf from a drill, the drill having a body, a chuck and a bit, comprising:

a flexible and elastic member adapted to enclose the drill chuck and bit, said member having two open ends, one of said ends detachably attachable to the drill body in a swarf tight manner, the other said end adapted to frictionally engage a surface to be drilled, said member having an inner dimension greater than the drill chuck, whereby said member surrounds and is spaced apart from the drill chuck and bit so that the chuck and bit may freely rotate within said member without contact with said member, said member having a corrugated body, the exterior of which has plural recesses; and at least one foam ring, each said foam ring removably held, respectively, in said recesses.

16. A boot as in claim 15, further comprising a flange extending radially outward from said other end of said member, said flange adapted for frictional engagement with the surface to be drilled.

* * * * *